United States Patent [19]

Graves

[11] Patent Number: 4,494,118
[45] Date of Patent: Jan. 15, 1985

[54] DIRECTION FINDING INTERFEROMETER INTERNAL CALIBRATION SYSTEM

[75] Inventor: Ross E. Graves, Santa Fe, N. Mex.

[73] Assignee: Hughes Aircraft Company, El Segundo, Calif.

[21] Appl. No.: 524,274

[22] Filed: Aug. 18, 1983

[51] Int. Cl.³ .............................................. G01S 5/02
[52] U.S. Cl. .................................. 343/424; 343/442; 343/17.7
[58] Field of Search ............... 343/372, 417, 424, 442, 343/17.7

[56] References Cited

U.S. PATENT DOCUMENTS 4,454,513  6/1984  Russell .............................. 343/18 E Primary Examiner—Theodore M. Blum
Attorney, Agent, or Firm—C. L. Anderson; W. J. Benman, Jr.; A. W. Karambelas

[57] ABSTRACT

An internal calibration system is provided for use with a direction finding interferometer which comprises a plurality of receiving antenna elements ($A_1$, $A_2$), a local oscillator (20), a master receiving channel means (41), a receiving channel means (42), and a phase meter (92). The internal calibration system comprises a master switch (22), a master power divider and switch assembly (31), a power divider and switch assembly (32), two transmission lines ($M_1$, $M_2$) connected to the master switch assemblies (31, 32), an inter-channel transmission line ($T_{12}$) connected to the master power divider and switch assembly (31) and to the other power divider and switch assembly (32), and a plurality of couplers (51, 52).

5 Claims, 5 Drawing Figures

DIRECTION FINDING INTERFEROMETER INTERNAL CALIBRATION SYSTEM

TECHNICAL FIELD

This invention relates to direction finding interferometers and, more particularly, to calibration systems for such interferometers.

BACKGROUND OF THE INVENTION

1. Field of the Invention

A direction finding interferometer determines direction by ascertaining phase differences in signals received by multiple antennas. Frequent recalibration of such devices is necessary because the transmission characteristics of the various transmission lines and components can vary due to, for example, thermal effects and equipment aging. Recalibration determines the phase differences between the receiver channels following the antenna elements.

Recalibration is especially problematic in long-baseline interferometers, in which the antenna elements are spaced far apart. In such an interferometer it is not feasible to control precisely the electrical lengths of the transmission lines that are necessary for recalibration of the interferometer. What is needed is a recalibration system which permits frequent recalibration and is independent of transmission line length.

2. Description of the Prior Art

In general, recalibration systems for direction finding interferometers in the prior art require external calibration means such as beacons and associated instrumentation, which are generally not feasible for frequent recalibration. Alternative systems require stabilization of the electrical lengths of the transmission lines.

For example, M. Nollet et al., "Advanced VHF Interferometer Spacecraft Tracking System," Electrical Communication, Vol. 49, No. 3, 1974, discloses a system for reducing errors due to the uncertainty of the electrical lengths of the transmission lines. Bidirectional transmission of two calibration signals at different frequencies through the system is used to determine the electrical lengths of the transmission lines. However, precise calibration is impaired by indeterminable frequency-related phase shifts through the different network paths.

SUMMARY OF THE INVENTION

An internal calibration system provides for efficient, effective and economical calibration of a direction finding interferometer. The calibration system may be used in the context of a direction finding interferometer having receiving antenna elements, a local oscillator, at least one phase meter, and channel receiving means associated with each receiving antenna element. Each said channel receiving means includes a radio-frequency preamplifier, a mixer connected to the radio-frequency preamplifier, and the local oscillator. An internal intermediate-frequency amplifier is connected to the mixer and the phase meter.

The internal calibration system may include a source for providing a calibrate signal. A calibrate signal is directed via a master switch to one of several power dividers. Each power divider is operatively connected to a respective channel receiving means. A master transmission line may guide a calibrate signal from the master switch to the input of a respective power divider.

Each power divider includes a first output which is switchably connected to an inter-channel transmission line which extends to the first output of another of the power dividers. A second output of each power divider is operatively connected to the respective channel receiving means. This connection may be effected by a coupler between the antenna element and the respective radio-frequency preamplifier. Secondary switching means associated with each power divider permit a calibrate signal to bypass the power divider while passing from an inter-channel transmission line to the associated channel receiving means.

The described internal calibration system can direct a calibrate signal alternately through at least two circuits. In operation, the source generates a calibrate signal which is directed by the master switch to a first power divider. Part of the divided calibrate signal exits a first output of the power divider and is transmitted via an inter-channel transmission line to the channel receiving means associated with a second power divider. The secondary switching means associated with this second power divider is set so that the second power divider is bypassed. The other part of the divided calibrate signal is coupled into the channel receiving means associated with the first power divider. The phases of the divided parts are compared as they reach the phase meter.

The above operation is repeated except the calibrate signal is directed to the second power divider, and the first power divider is bypassed. Again a phase difference is obtained. Comparison of the two phase differences provides the information needed to accurately calibrate the incorporating direction finding interferometer. This calibration may be performed frequently and is independent of the lengths of the various transmission lines.

DETAILED DESCRIPTION OF THE INVENTION

Figure 1:
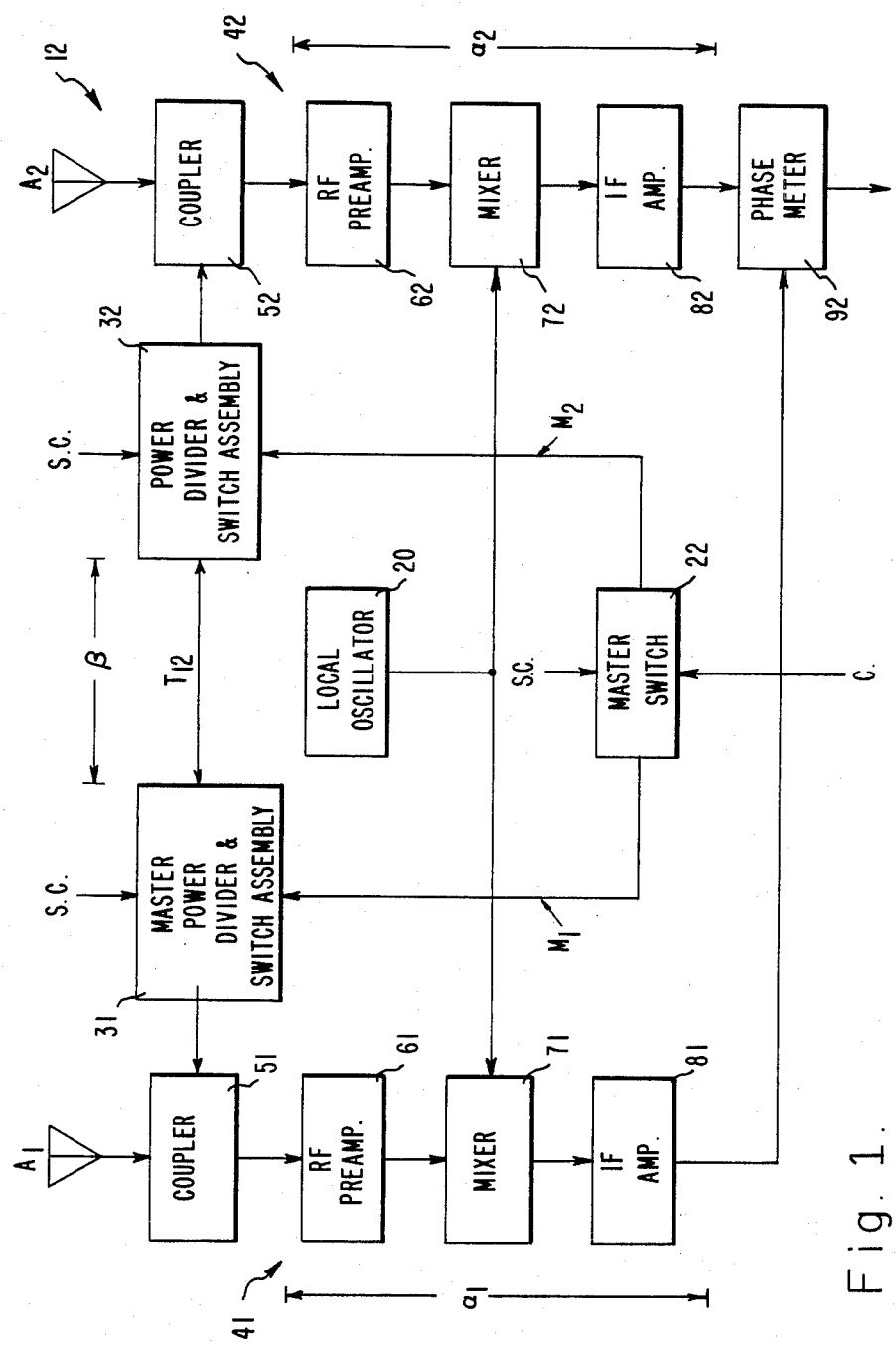
FIG. 1 is a block diagram of an internal calibration system for a direction finding interferometer in accordance with the present invention.

Referring to FIG. 1, there is shown a two-element direction finding interferometer, generally designated 12. Interferometer 12, in the example, comprises two antenna elements $A_1$ and $A_2$, a local oscillator 20, a master receiving channel means 41, a receiving channel means 42, a phase meter 92, master transmission lines $M_1$ and $M_2$, and inter-channel transmission line $T_{12}$.

More particularly, master receiving channel means 41 comprises a radio-frequency (RF) preamplifier 61, a mixer 71 which is connected to both RF preamplifier 61 and local oscillator 20, and an intermediate-frequency (IF) amplifier 81 which is connected to mixer 71. Receiving channel means 42 comprises a corresponding set of RF preamplifier 62, mixer 72, and IF amplifier 82. Lastly, phase meter 92 is connected to both IF amplifiers 81 and 82 of master receiving channel means 41 and receiving channel means 42, respectively.

In accordance with the present invention, the internal calibration system for interferometer 12 comprises a master switch 22, a master power divider and switch assembly 31, a power divider and switch assembly 32, transmission lines $M_1$, $M_2$, $T_{12}$, and couplers 51 and 52.

Figure 2:
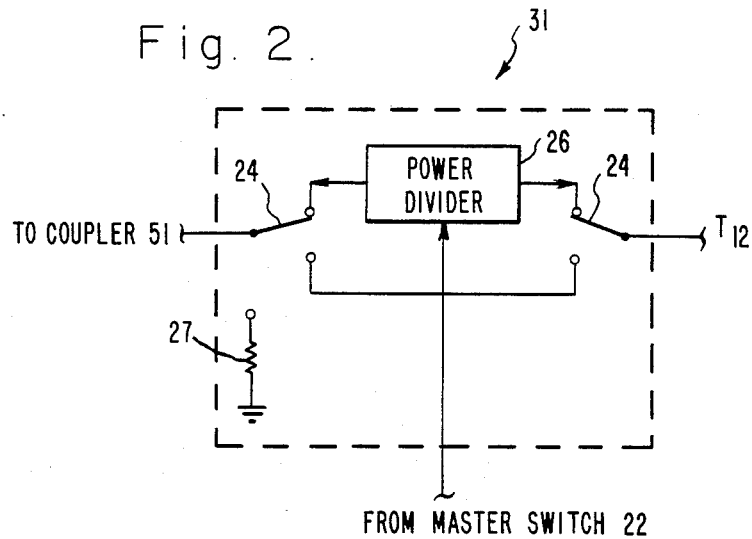
FIG. 2 is an enlarged schematic diagram of a power divider and switch assembly of the internal calibration system of FIG. 1.
Figure 3:
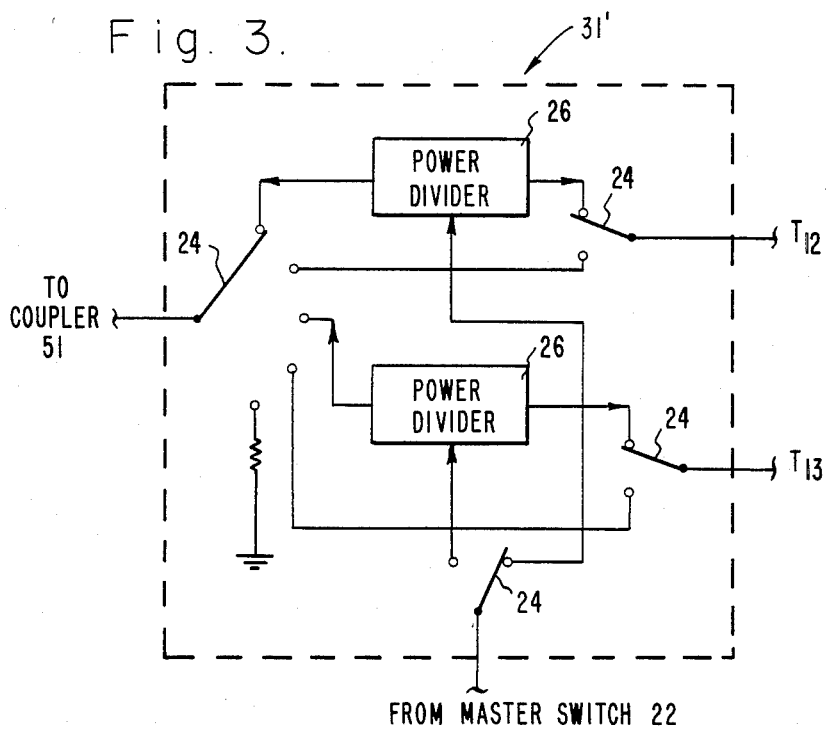
FIG. 3 is an enlarged schematic diagram of an alternative embodiment of the master power divider and switch assembly of FIG. 2, adapted for use with a three-element interferometer.
Figure 4A:
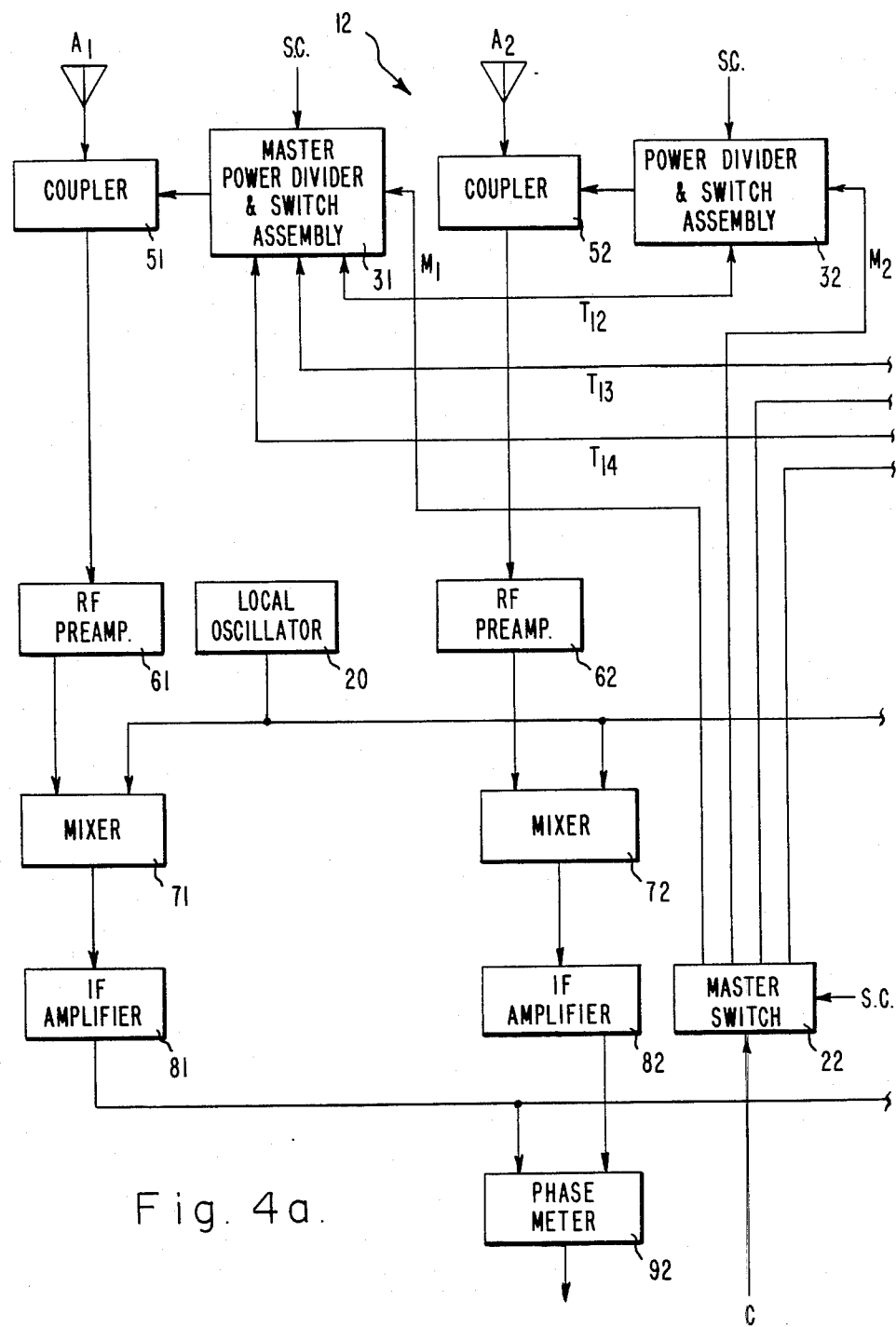
FIGS. 4a and 4b are block diagrams of an alternative embodiment of the internal calibration system of FIG. 1, adapted for use with a four-element interferometer.
Figure 4B:
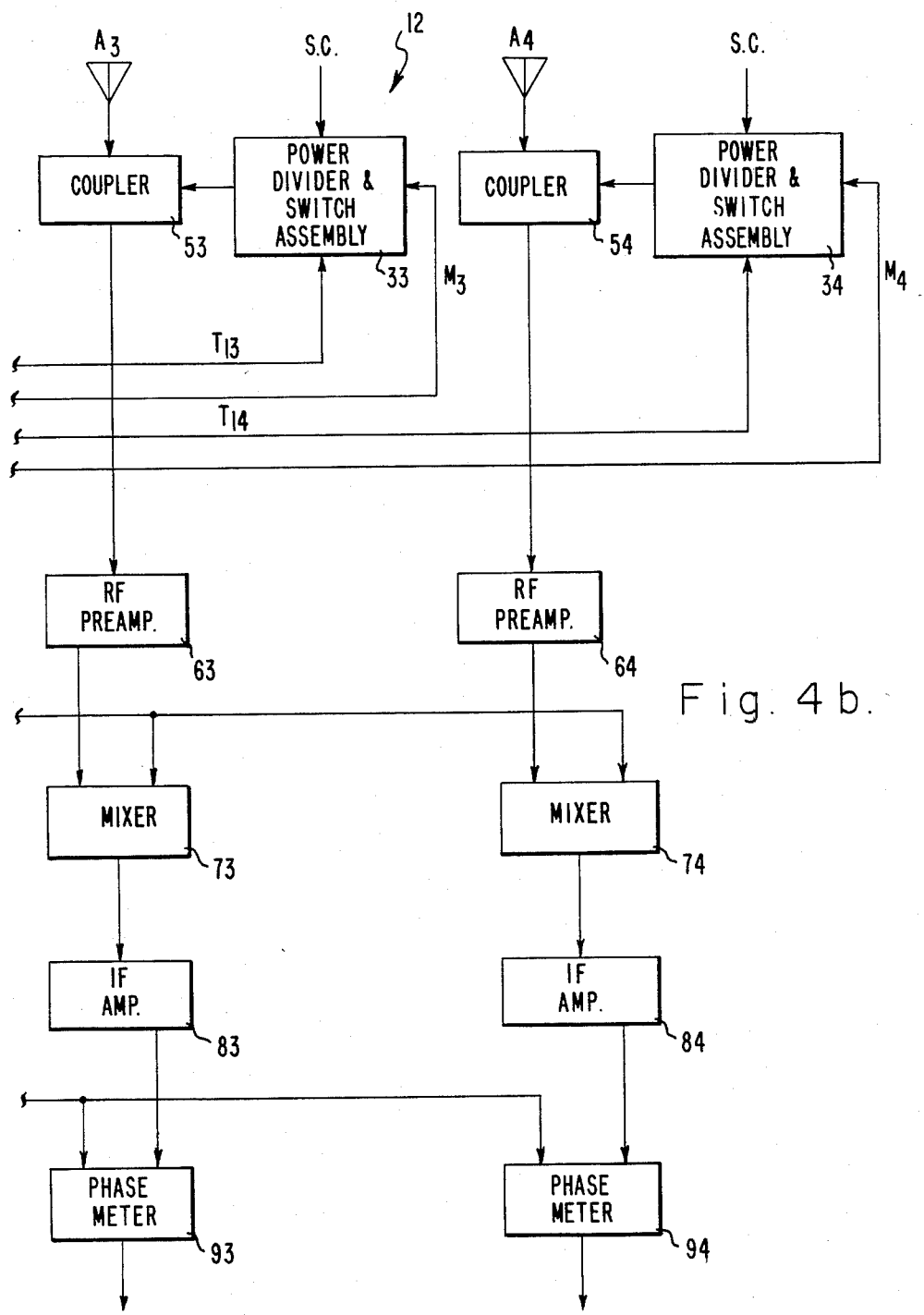

More particularly, master switch 22 is adapted to receive a switch control signal SC and a calibrate signal C. Switch control signal SC and calibrate signal C are generated by conventional means and techniques. Master power divider and switch assembly 31 is connected to master switch 22 by transmission line $M_1$ and is also adapted to receive the switch control signal SC. Similarily, power divider and switch assembly 32 is connected to both master assembly 31 via a transmission line $T_{12}$ and master switch 22 by transmission line $M_2$, and is also adapted to receive switch control signal SC. Master assembly 31 and assembly 32 are positioned in close proximity to their corresponding antenna elements $A_1$ and $A_2$, respectively. Master power divider and switch assembly 31 comprises switches 24 and a power divider 26, as shown in FIG. 2. Power divider 26 is connected to master switch 22 by transmission line $M_1$, and switchably connected to both coupler 51 and transmission line $T_{12}$. Since power divider and switch assembly 32 is identical to master assembly 31, although reverse in operation and connected to master switch 22 by transmission line $M_2$, only master assembly 31 is illustrated. Coupler 51 is connected to antenna element $A_1$, master assembly 31, anf RF preamplifier 61 of master channel means 41. Similarly, coupler 52 is connected to antenna element $A_2$, assembly 32, and RF preamplifier 62 of channel receiving means 42.

In the example, couplers 51 and 52, through which calibrate signals C are coupled into receiving channel means 41 and 42, have low coupling ratios, typically in the order of −20 dB, to minimize degradation of the interferometer noise figure. Power dividers 26 of power divider and switch assemblies 31 and 32 contain attenuators as required to assure that, when calibrate signal C is routed to a given power divider and switch assembly, the divided calibrate signal C introduced into the two receiving channel means 41 and 42 will be equal. In addition, attenuators are used to assure that the signal level of calibrate signals C introduced into the receiving channel means is the same when master switch 22 is in the second position as when it is in the first position. All switches, both master switch 22 and switches 24 of assemblies 31 and 32, are controlled by suitably synchronized switch control signals SC.

More particularly, a phase shift in master receiving channel means 41, between the input of RF preamplifier 61 and the output of IF amplifier 81, is designated as $\alpha_1$. Similarly, the phase shift in receiving channel means 42 is designated as $\alpha_2$. The phase shift between assemblies 31 and 32, that is, the phase shift in inter-channel transmission line $T_{12}$, is designated as $\beta$. $\alpha_1$, $\alpha_2$, and $\beta$ are taken as phase lags in the example.

In operation, a calibrate signal C is switched alternately between two calibration transmission lines, $M_1$ and $M_2$, one of which is connected to master power divider and switch assembly 31 and the other of which is connected to power divider and switch assembly 32. The calibrate signal C is generated by conventional means and techniques. In the first mode, master switch 22 is placed in a first position such that it routes calibrate signal C to master power divider and switch assembly 31, as best shown in FIG. 2. In master assembly 31, calibrate signal C is divided into two portions. One portion of calibrate signal C is coupled into master receiving channel means 41 through coupler 51 immediately following the feed of antenna element $A_1$. The second portion of calibrate signal C is routed to power divider and switch assembly 32 via transmission line $T_{12}$. The second portion of calibrate signal C that propagates through transmission line $T_{12}$ is sufficiently larger than the first portion in order to compensate for line losses in transmission line $T_{12}$. Thus, the amplitudes of each of the two portions of calibrate signal C at either coupler 51 or coupler 52 are approximately the same. In power divider and switch assembly 32, the second portion of calibrate signal C is coupled into receiving channel means 42 through coupler 52. In the first mode, the second portion of calibrate signal C from transmission line $T_{12}$ bypasses power divider 26 of assembly 32 and switches directly into coupler 52. Each portion of calibrate signal C then propagates through its respective receiving channel means 41, 42. Lastly, phase meter 92 measures a first phase difference of the outputs of receiving channel means 41 and 42, $\phi_1 = \alpha_1 - \alpha_2 - \beta$ (modulo $2\pi$). Equality modulo $2\pi$ means that the two sides of the equation differ, if at all, by an integral multiple of $2\pi$ radians.

In the second mode, master switch 22 is placed in a second position such that it routes calibrate signal C to power divider and switch assembly 32. Similarly, assembly 32 divides calibrate signal C into two portions. One portion of calibrate signal C is coupled into receiving channel means 42 through coupler 52 immediately following the feed of antenna element $A_2$. The second portion of calibrate signal C is routed to master power divider and switch assembly 31 via the same transmission line $T_{12}$. In master assembly 31, the second portion of calibrate signal C is coupled into master receiving channel means 41 through coupler 51. Similarly, the second portion of calibrate signal C in the second mode bypasses power divider 26 of master assembly 31 and switches directly into coupler 51. In the second mode, phase meter 92 measures a second phase difference of the outputs of receiving channel means 41 and 42, $\phi_2 = \alpha_1 - \alpha_2 + \beta$ (mod $2\pi$). The operation in the second mode is thus the same as that for the first mode except that the roles of the elements associated with antenna element $A_1$ and those associated with antenna element $A_2$ are reversed.

In accordance with the present invention, the theory of operation of the internal calibration system is summarized by the phase difference equations $\phi_1$ and $\phi_2$.

$$\phi_1 + \phi_2 = (\alpha_1 - \alpha_2 - \beta) + (\alpha_1 - \alpha_2 + \beta) \quad \text{(mod } 2\pi\text{),}$$

or $$2(\alpha_1 - \alpha_2) = \phi_1 + \phi_2 \quad \text{(mod } 2\pi\text{).}$$

Note initially that the difference of the sum of the phase shifts through power divider and switch assemblies 31 and 32 in the first mode and the second mode is generally invariant with respect to time. The value of this constant need not be known explicitly as it is accounted for in the initial external calibration. Similarly, the difference of the phase shifts of signals introduced by couplers 51 and 52 on signals received by antenna elements $A_1$ and $A_2$ is also generally invariant with respect to time. For the purpose of interferometer calibration, the ceived from master switch 22 sequentially, when it is in calibration mode one, to any of the other three power divider and switching assemblies 32, 33, and 34 through appropriate inter-channel transmission lines $T_{12}$, $T_{13}$, $T_{14}$. Similarly, master power divider and switch assembly 31 receives calibrate signal C from any of the three interchannel transmission lines $T_{12}$, $T_{13}$, $T_{14}$, when calibrate signal C is first routed to one of the other power divider and switch assemblies by placing master switch 22 in the other calibration modes. Power dividers 26 of the power divider and switch assemblies contain attenuators as appropriate so that the signal levels introduced into the receiving channel means are independent of both the choice of the antenna element paired with antenna element $A_1$ for calibration and the direction of flow of calibration signal C through the corresponding transmission line connecting the paired antenna element with antenna element $A_1$.

It will be apparent to those skilled in the art that various modifications may be made within the scope of the present invention. For example, when an interferometer contains n antenna elements and n receiving channel means, where n is an integer, the internal calibration system associated with the interferometer may incorporate n power divider and switch assemblies, n couplers, n transmission lines from the master switch to the master power divider switch assemblies, and n−1 transmission lines between the master power divider and switch assembly and the other power divider and switch assemblies.

What is claimed is:

1. An internal calibration system for use with a direction finding interferometer having a plurality or receiving antenna elements, a local oscillator, at least one phase meter, and a plurality of channel receiving means associated with each said receiving antenna element, each said channel receiving means including a radio-frequency preamplifier, a mixer connected to both said radio-frequency preamplifier and said local oscillator, and an internal intermediate-frequency amplifier connected to said mixer and one of said at least one phase meter, said internal calibrations system comprising:
   plural power dividers, each power divider having an input and first and second outputs, each power divider being associated with one of said channel receiving means, the second output of each power divider being operatively connected to the associated of said channel receiving means;
   a master switch operatively connected to said power dividers for directing a calibrate signal to selected of said power dividers;
   a signal source for providing the calibrate signal to said master switch;
   at least one inter-channel transmission line switchably connected to the first output of each of two of said power dividers; and
   secondary switching means associated with each power divider to permit the calibrate signal to bypass said power divider while passing from one of said at least one inter-channel transmission line to the associated channel receiving means.

2. An internal calibration system for use with a direction finding interferometer having a plurality of receiving antenna elements, a local oscillator, at least one phase meter, and a plurality of channel receiving means associated with each said receiving antenna element, each said channel receiving means including a radio-frequency preamplifier, a mixer connected to both said radio-frequency preamplifier and said local oscillator, and an internal intermediate-frequency amplifier connected to said mixer and one of said at least one phase meter, said internal calibration system comprising:
   a signal source for providing a calibrate signal;
   plural master transmission lines, each adapted for transmitting the calibrate signal;
   a master switch for directing the calibrate signal provided by said signal source to selected of said master transmission lines;
   plural power dividers, each power divider having an input and first and second outputs, each power divider being connected to one of said master transmission lines so that the calibrate signal can be received as an input;
   at least one inter-channel transmission line switchably connected to the first output of ech of two of said power dividers;
   plural couplers, each coupler being associated with a channel receiving means and being adapted for coupling the calibrate signal from the second output of one of said power dividers into the associated of said channel receiving means between the included radio-frequency preamplifier and the associated antenna element; and
   secondary switching means associated with each power divider to permit the calibration signal to bypass said power divider while passing from one of said at least one inter-channel transmission line to the associated of said couplers.

3. The internal calibration system of claims 1 or 2 wherein said direction finding interferometer is a long-baseline type.

4. The internal calibration system of claim 3, wherein said interferometer comprises two of said receiving antenna elements, said local oscillator, said master receiving channel means, one of said receiving channel means, and one of said phase meters, and
said system comprises said master switch, said master power divider and switch assembly, one of said secondary power divider and switch assemblies, two of said master transmission lines connecting said master switch and said power divider and switch assemblies, and one of said inter-channel transmission lines between said power divider and switch assembly and secondary divider and switch assembly, and two of said couplers each of which corresponds to one of said channel means.

5. The internal calibration system of claim 3, wherein said interferometer comprises four of said receiving antenna elements, said local oscillator, said master receiving channel means, three of said receiving channel means, and three of said phase meters, and
said system comprises said master switch, said master power divider and switch assembly, three of said secondary power divider and switch assemblies, four of said transmission lines connecting said master switch and said power divider and switch assemblies, and three of said transmission lines between said master power divider and switch assembly and said second secondary divider and switch assemblies, and four of said couplers each of which corresponds to one of said channel means.

* * * * *